US006765953B1

United States Patent
Harms et al.

(10) Patent No.: US 6,765,953 B1
(45) Date of Patent: Jul. 20, 2004

(54) USER TERMINAL PARALLEL SEARCHER (75) Inventors: Brian K. Harms, Boulder, CO (US); Sherman Gregory, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/390,453

(22) Filed: Sep. 7, 1999

Related U.S. Application Data (60) Provisional application No. 60/099,639, filed on Sep. 9, 1998.

(51) Int. Cl.[7] .............................. H04L 27/30; H04B 1/69
(52) U.S. Cl. ........................................ 375/150; 375/147
(58) Field of Search ................................ 375/147, 148, 375/150, 140, 142, 144, 136, 343; 370/335, 336, 342, 345, 441

(56) References Cited

U.S. PATENT DOCUMENTS

| | | | |
|---|---|---|---|
| 5,577,025 A | 11/1996 | Skinner et al. | ............... 370/22 |
| 5,799,010 A | 8/1998 | Lomp et al. | ............... 370/335 |
| 6,115,410 A | * 9/2000 | Naruse | ...................... 375/200 |
| 6,154,487 A | * 11/2000 | Murai et al. | ................. 375/150 |
| 6,332,008 B1 | * 12/2001 | Giallorenzi et al. | ......... 375/356 |

FOREIGN PATENT DOCUMENTS

| | | | |
|---|---|---|---|
| EP | 0945992 | 9/1999 | ........... H04B/1/707 |

* cited by examiner

*Primary Examiner*—Stephen Chin
*Assistant Examiner*—Lawarence Williams
(74) *Attorney, Agent, or Firm*—Philip R. Wadsworth; Gregory D. Ogrod (57) ABSTRACT

The present invention is a method and apparatus for detecting the presence of or acquiring a signal in a data stream, where the signal has been spread using a pseudonoise sequence. The method comprises the steps of delaying a pseudonoise sequence by a plurality of predetermined delays to produce a plurality of delayed pseudonoise sequences, combining each of the delayed pseudonoise sequences with the data stream to produce a plurality of despread data streams, and accumulating each of the despread data streams for a preselected duration to produce a plurality of coherent sums. Each of the coherent sums are accumulated for a further duration to produce a plurality of non-coherent sums. The non-coherent sums are examined to determine the most likely PN offset hypothesis.

13 Claims, 10 Drawing Sheets

CONTINUED FROM FIGURE 9A

USER TERMINAL PARALLEL SEARCHER

This application claims the benefit of Provisional application No. 60/099,639 field Sep. 9, 1998.

BACKGROUND OF THE INVENTION

I. Field of the Invention

The present invention relates generally to multiple-access spread-spectrum communication systems and networks. More specifically, the present invention relates to a method and apparatus for acquiring signals in such systems.

II. Description of the Related Art

In general, wireless communications systems can be terrestrial or satellite-based. An examplary terrestrial wireless communications system includes at least one terrestrial base station and at least one user terminal (for example, a mobile telephone). The base station provides links from a user terminal to other user terminals or communications systems, such as a terrestrial telephone system. An examplary satellite-based wireless communications system includes at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system. Some of these wireless communication systems employ spread spectrum techniques.

In a typical spread-spectrum communications system, a set of preselected pseudorandom noise (PN) code sequences is used to modulate (i.e., "spread") information signals over a predetermined spectral band prior to modulation onto a carrier signal for transmission as communications signals. PN spreading, a method of spread-spectrum transmission that is well known in the art, produces a signal for transmission that has a bandwidth much greater than that of the data signal. In a satellite forward communications link (that is, in a communications link originating at a gateway and terminating at a user terminal), PN spreading codes are used to discriminate between signals transmitted by a gateway over different beams, and to discriminate between multipath signals. These PN codes are usually shared by all communications signals within a beam.

In an examplary CDMA spread-spectrum system, "channelizing" codes are used to discriminate between signals intended for particular user terminals (hereinafter referred to as "traffic signals") transmitted within a satellite beam or sub-beam on the forward link. The channelizing codes form orthogonal channels in a subbeam over which communication signals are transferred. That is, a unique orthogonal channel is provided for each user terminal on the forward link by using a unique "channelizing" or covering orthogonal code to modulate signals intended for that user terminal. Walsh functions are generally used to implement the channelizing codes, also known as Walsh codes or Walsh sequences, with a typical length being on the order of 64 code chips for terrestrial systems and 128 code chips for satellite systems.

Typical CDMA spread-spectrum communications systems contemplate the use of coherent modulation and demodulation for forward link user terminal communications. In communications systems using this approach, a "pilot" carrier signal (hereinafter referred to as a "pilot signal") is used as a coherent phase reference for forward links. That is, a pilot signal, which contains no data modulation, is transmitted by a gateway throughout a region of coverage. A single pilot signal is usually transmitted by each gateway for each beam used for each frequency used. These pilot signals are shared by all user terminals receiving signals from the gateway on a given beam.

Pilot signals are used by user terminals to obtain initial system synchronization and for time, frequency, and phase tracking of other signals transmitted by the gateway. Phase information obtained from acquiring and tracking a pilot signal is used as a carrier phase reference for coherent demodulation of other system signals or traffic signals. This technique allows many signals to share a common pilot signal as a phase reference, providing for a less costly and more efficient tracking mechanism. In addition to pilot signals, there are other shared resources such as paging and synchronization signals used to transmit system overhead information and specific messages to user terminals.

Because a pilot signal usually does not involve data modulation, a spread-spectrum pilot signal can be characterized as a carrier signal modulated by a PN spreading code. In one approach, all pilot signals within a communications system use the same PN spreading code or set of codes, but each beam uses a different relative code timing offset. This provides signals that can be readily distinguished from each other while providing simplified acquisition and tracking. In another approach, each pilot signal can be generated using a different PN code.

CDMA systems require rapid and accurate acquisition of the timing of the pilot PN sequence. The timing of the PN sequence must be known accurately in order to obtain information from modulated signals. The acquisition of this timing must be rapid to avoid delaying the acquisition of communication signals or establishing communication links which could unacceptably frustrate system-users.

The search process involves generating timing hypotheses and testing each hypothesis to ascertain which provides the most likely or best match to the signal timing, sometimes referred to as finding the "correct" hypothesis. One common design objective, however, is to reduce the complexity and cost of the user terminal. Therefore, a minimum amount of resources may be provided, including circuitry or processing capability. For this reason, some conventional searchers test the hypotheses serially, eliminating each less likely or incorrect hypothesis before testing the next. However, this approach is also very time-consuming, potentially delaying signal acquisition an unacceptable amount.

Another conventional approach is to test the hypotheses in two stages. In the first stage, the least likely hypotheses are eliminated. In the second stage, each remaining hypothesis is tested serially. While this approach requires less time than the single-stage approach described above, it is still very time-consuming.

What is needed is a technique and apparatus to rapidly test hypothesis and quickly acquire pilot, and, therefore, other communication signals.

SUMMARY OF THE INVENTION

In one aspect the present invention provides a user terminal parallel searcher comprising a pseudonoise (PN) code generator for generating at least one pseudonoise sequence, a plurality of slices or slice processing elements, and a non-coherent accumulator that accumulates the output of each slice non-coherently to produce a non-coherent sum for each slice. Each slice includes a delay unit for delaying the pseudonoise sequence by a predetermined chip time, a despreader for operating on a data stream as a function of a previously delayed pseudonoise sequence, and at least one coherent accumulator for coherently accumulating an output of the despreader. An output from the pseudonoise generator is coupled to an input of the of the first slice. Each slice receives an output from the delay unit of the previous slice.

In another aspect, the present invention provides a method for detecting the presence of a signal in a data stream, where the signal has been spread using a pseudonoise sequence. The method comprises the steps of delaying a pseudonoise sequence by a plurality of predetermined delays to produce a plurality of delayed pseudonoise sequences, combining each of the delayed pseudonoise sequences with the data stream to produce a plurality of despread data streams, and accumulating each of the despread data streams for a duration to produce a plurality of coherent sums.

One advantage of the present invention is that it permits a receiver to search many PN offsets simultaneously, thereby reducing overall signal acquisition time. The invention also allows a receiver to search over multiple PN codes, multiple orthogonal codes or pilot channels, and multiple frequency ranges, each of which provides receiver with increased flexibility and usefulness, especially for advanced communication system designs. This process is not adversely affected by the presence of an outer code in multi-layered code environments.

Another advantage of the present invention is that it reduces the amount of resources required to perform non-coherent accumulation and other operations in a searcher receiver.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The present invention is a system and method for quickly and accurately acquiring a signal, such as the pilot signal, in a spread-spectrum communications system. More specifically, the present invention identifies the pseudonoise sequence (also referred to as a "PN code") and particular timing offset of the PN code that was used to spread the signal prior to its transmission, along with the pilot orthogonal channel code, Walsh sequence, assignment, and a course estimate of the Doppler frequency offset. When the timing offset (also referred to as a "PN offset") has been determined, it is used in conjunction with the PN code to despread signals.

The present invention is particularly suited for use in communications systems employing low Earth orbit (LEO) satellites. However, as would be apparent to one skilled in the relevant art, the present invention can also be applied to other types of communications systems where the length of time for signal acquisition is an important factor. Before discussing the embodiments of the present invention, a typical environment in which the invention can operate is presented.

II. A Typical Wireless Communications System

Figure 1:
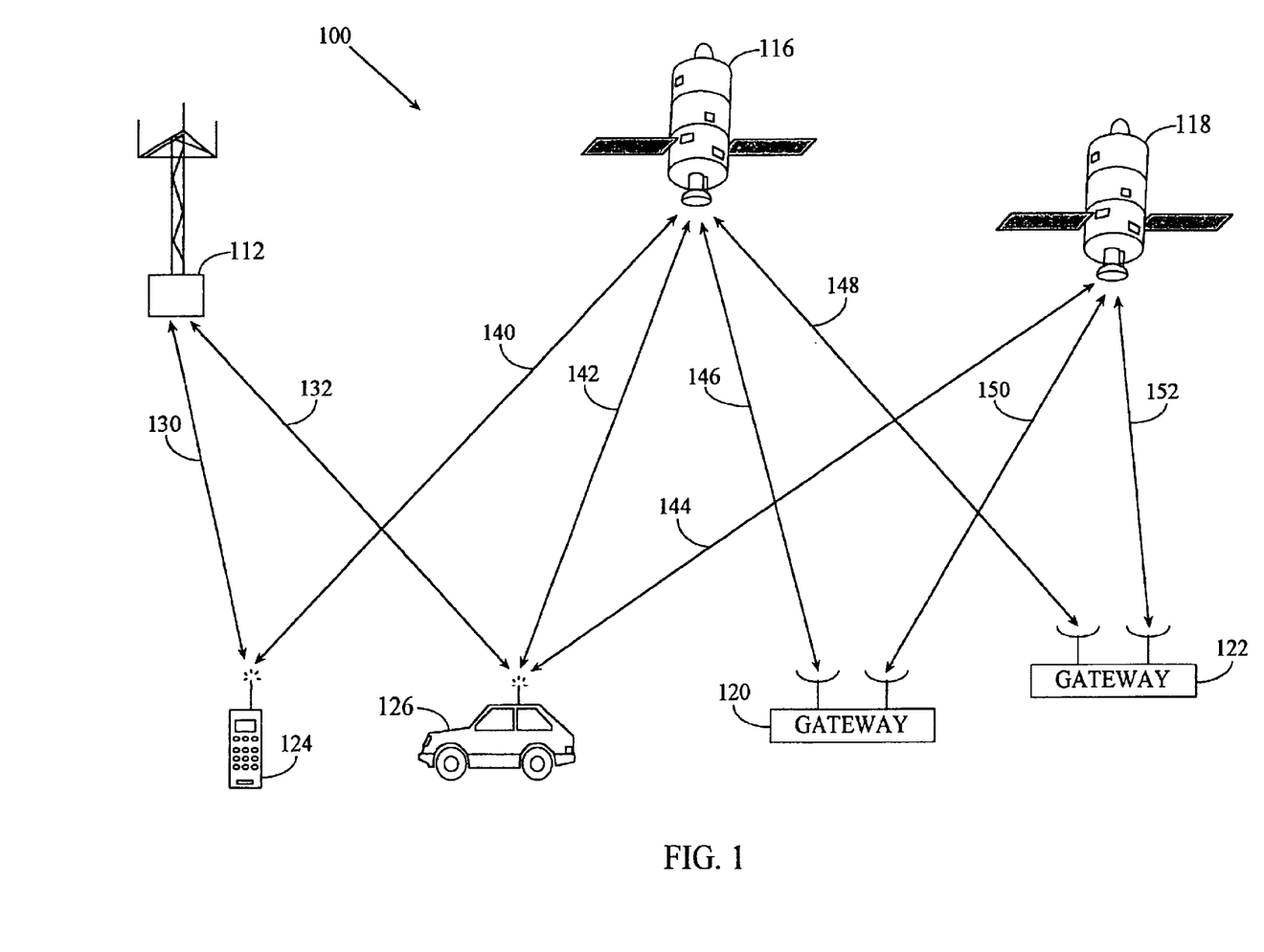
FIG. 1 illustrates an exemplary wireless communication system in which the present invention is useful.

An exemplary wireless communication system in which the present invention is useful is illustrated in FIG. 1. It is contemplated that this communication system uses code division multiple access (CDMA) type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depends on desired system capacity and other factors well understood in the art.

User terminals 124 and 126 each include a wireless communication device such as, but not limited to, a wireless telephone, a data transceiver, or a paging or position determination receiver, and can be hand-held, mobile or vehicle mounted, or fixed station units or vehicle-mounted as desired. A typical hand held unit is similar in design to a conventional cellular phone. In a preferred embodiment, the hand held unit can communicate with terrestrial cellular networks as well as with satellites 116 and 118. A typical mobile user terminal includes a hand set and a car kit, that provides battery power, a higher RF power output and a higher gain antenna. Fixed station units communicate with satellite 102, but typically not with other terrestrial cellular networks. The fixed station units are generally used to serve areas that are not served by terrestrial cellular or wireline networks.

Generally, beams from satellites 116 and 118 cover different geographical areas in predefined patterns. Beams at different frequencies, also referred to as FDM signals, CDMA channels in a CDMA system, or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations, or base stations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one-way or two-way communication systems, or simply to transfer messages or data to user terminals 124 and 126.

Figure 2:
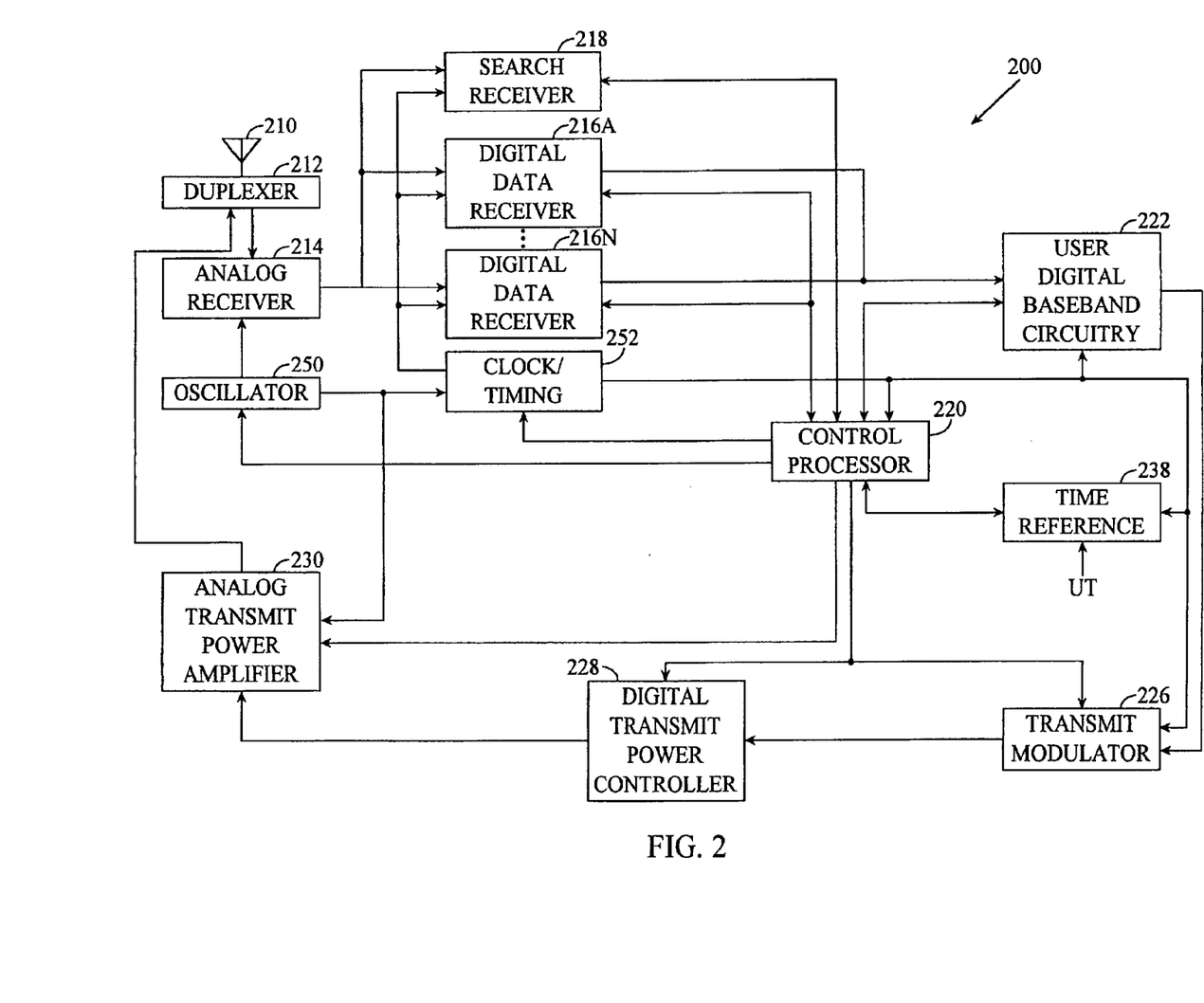
FIG. 2 illustrates an exemplary transceiver for use in a user terminal.

An exemplary transceiver 200 for use in a user terminal 124 or 126 is illustrated in FIG. 2. Transceiver 200 uses at least one antenna 210 for receiving communication signals, which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on an acceptable level of user terminal cost or complexity, as would be apparent to one skilled in the relevant art. The digital receivers are generally referred to as "fingers" which form a "rake" receiver. Each finger is capable of tracking, uncovering, and demodulating an incoming signal.

At least one user terminal control processor 220 is coupled to digital data receivers 216A–216N and searcher receiver 218. Control processor 220 provides, among other functions, basic signal processing, timing, power and hand-off control or coordination, and selection of frequency used for signal carriers. Another basic control function often performed by control processor 220 is the selection or manipulation of pseudonoise (PN) code sequences or orthogonal functions to be used for processing communication signal waveforms, and their respective timing, as discussed further below. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources, as would be understood by one skilled in the art.

The outputs of digital data receivers 216A–216N are coupled to digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user digital baseband circuitry 222 using elements well known in the art. If diversity signal processing is employed, user digital baseband circuitry 222 can comprise at least one diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Digital receivers 216A–N and searcher receiver 218 are configured with signal correlation elements to demodulate or track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination. A preferred application is in CDMA wireless spread spectrum communication systems for telephone service.

III. Searcher Receiver

Figure 3:
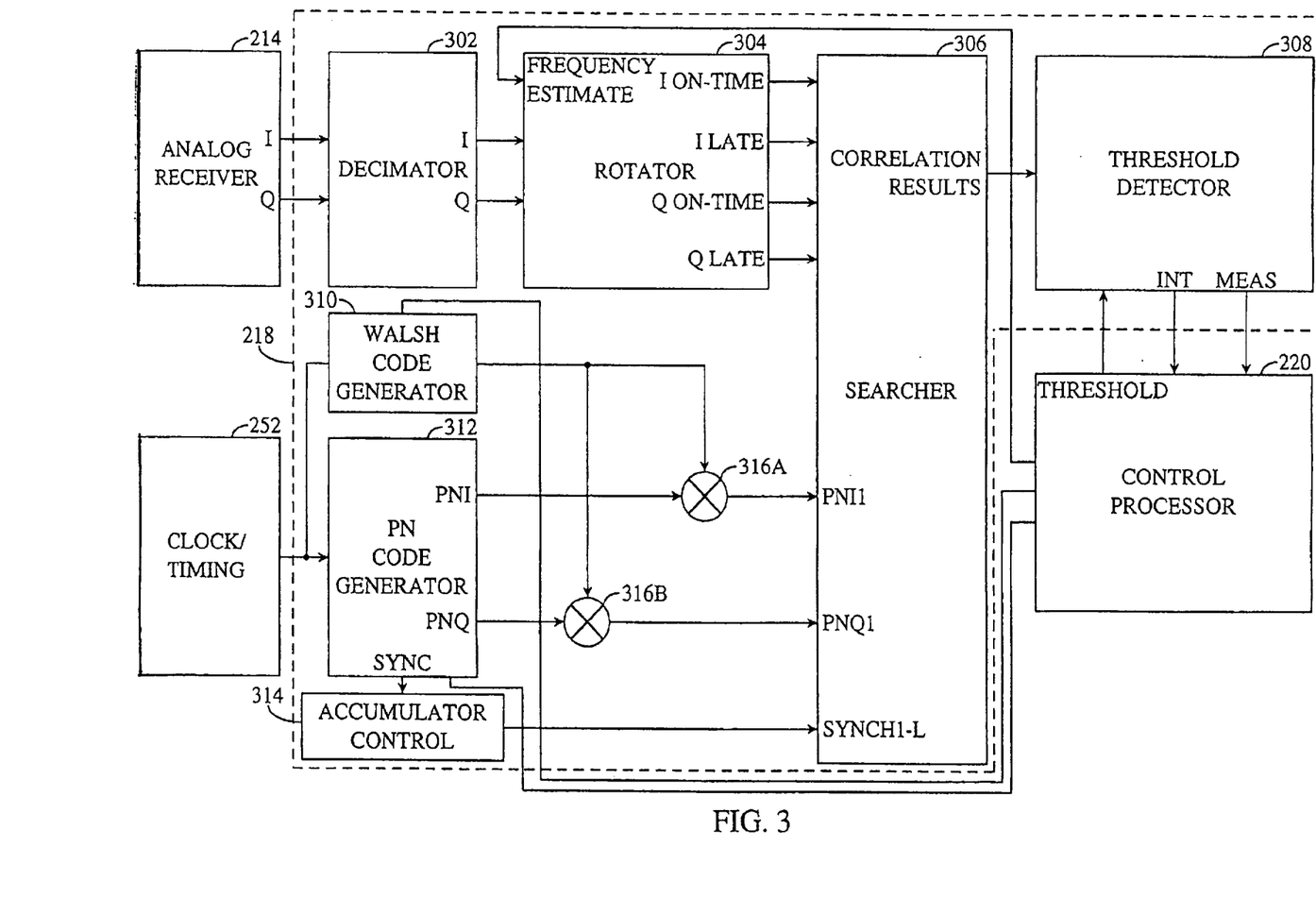
FIG. 3 is a block diagram depicting the architecture of a searcher receiver according to a preferred embodiment of the present invention.

FIG. 3 is a block diagram depicting the architecture of searcher receiver 218 according to a preferred embodiment of the present invention. Searcher receiver 218 includes decimator 302, rotator or complex rotator 304, searcher processor or engine 306, also referred to simply as a searcher, threshold detector 308, orthogonal (Walsh) code generator 310, pseudonoise (PN) code generator 312, accumulator controller 314, and multipliers or combiners 316A and 316B. Analog receiver 214, clock/timing unit 252, and control processor 220 are shown for reference.

As mentioned above, digital communication signals output by analog receiver 214 are transferred to searcher receiver 218. In a preferred embodiment, these signals include an in-phase (also referred to as "I-channel") signal and a quadrature (also referred to as "Q-channel") signal. These signals are received by decimator 302. In a preferred embodiment, the digitization of the communications signals by analog receiver 214 results in a digital signal that is oversampled, with eight times oversampling being typical. That is, the resulting I-channel and Q-channel signals each contain eight samples per code chip element. Decimator 302 selects two of each of the eight samples for further processing. In a preferred embodiment, the selected samples are separated in time by one-half of a chip period. A chip period is the duration of one binary sequence element, similar to a binary bit, of the PN sequence. Therefore, the PN code is timed or clocked at a preselected chip or "chipping" rate referred to as chip×1, while the oversampled data has a corresponding clock rate of chip×8, as is discussed further below.

The selected samples are passed to rotator 304. Rotator 304 removes frequency error based on a frequency estimate by applying a phase rotation to the input signals. Complex rotator 304 also provides the four frequency-adjusted samples to searcher 306. These samples are collectively referred to as the "data stream," and are labeled in FIG. 3 as I ON-TIME and I LATE for the I-channel signals, and Q ON-TIME and Q LATE for the Q-channel signals.

In a preferred embodiment, the frequency estimate used by the rotator is produced by the searcher controller or control processor based on a set of frequency estimates designed or preselected to cover the entire Doppler or frequency shift range of interest for the communication system, as would be understood by those skilled in the art. Other known circuit elements or configurations can be employed to generate a frequency estimate without departing from the spirit and scope of the present invention. It can be seen that the decimation and rotation are accomplished in the same manner as typically used in the fingers or digital receivers.

By varying the frequency estimate, the present invention can be used to search the frequency dimension of a desired search space in trying to acquire one or more signals. The use of the complex rotator also allows searching over different frequency ranges, if desired, for example due to extreme Doppler shifts, or to compensate for error or drift in the local (UT) oscillator used for establishing timing and clock signals.

PN code generator 312 provides three signals based on timing information received from clock/timing unit 252. Two of these signals are PN code sequences or local copies of the PN codes to be used. In a preferred embodiment, a sequence is provided for each of the I and Q channels. In FIG. 3, these sequences are labeled "PNI" and "PNQ" respectively. The third signal is a timing or synchronization signal, labeled "SYNC" in FIG. 3, that provides information describing the state of the PN sequences to searcher 306. This information is used to control the operation of accumulators or other elements within searcher 306, as described in detail below.

In a preferred embodiment, PN code generator 312 is programmable, that is, the polynomial used to generate codes is programmable or alterable. The control processor can select different codes or different polynomials used in generating the PN codes, and can control the timing of, and interrupt or suspend, the generation process, as discussed later. This allows the searcher to quite flexibly search different PN codes and code spaces which is very useful in some communication systems. For example, in the exemplary satellite communication system, the satellites may each be "assigned" different PN codes, with some reuse allowed within each orbital plane (in view constraints), to assist in distinguishing which satellite a given signal or beam originates from. Alternatively or additionally, gateways and base stations may use different PN codes in pre-selected patterns or plans. The present invention readily accommodates and takes advantage of such PN code schemes.

Orthogonal code generator 310 provides one or more Walsh code sequences. In one embodiment, the same Walsh code sequence is provided for both the I and Q channels. In another embodiment, different Walsh code sequences are provided for each of the I and Q channels. Multipliers or combiners 316A and 316B combine the Walsh code sequences with the I and Q PN sequences, respectively. In some systems modulo-2 addition is used to achieve this operation. The combined signals, also referred to herein as PN sequences, are provided to searcher 306. In FIG. 3, these signals are labeled "PNI1" and "PNQ1."

By being able to vary or select the orthogonal or Walsh code sequence being used, the present invention can be used to search the channel or pilot code dimension of the search space. That is, varying the Walsh code checks for correlation across those codes selected or used in generating channelized signals. When a Walsh code or channel other than code 0 ($W_0$) is used, the controller can easily specify the Walsh code or channel to use. This can happen for example where two gateways share a single beam, and each needs a different pilot code to use in communication. This application of the orthogonal code generator allows searching on any Walsh channel and not just a single fixed one. Therefore, the invention can accommodate systems using multiple pilot channels or different pilot channels in different parts of the system.

The orthogonal code can be also applied to the 4 bit data stream in a typical manner, but application to the PN spreading/despreading code which is then used with the data stream is generally equivalent for pilot searching, and reduces hardware complexity.

Based on the data stream, the PN sequences, and the accumulator control signals, searcher 306 generates multiple hypothetical timing offsets (hypotheses) for the PN sequences. For each hypothesis, searcher 306 performs a correlation between the data stream and the PN sequence, offset by the hypothetical timing offset, to produce a pair of non-coherent sums (also referred to as "correlation results"). This process is described in detail below. Each non-coherent sum is related to the net energy received in the despread data stream. A large sum indicates a large amount of net energy, which indicates that the PN offset used to produce that sum is most likely a correct or appropriate timing hypothesis.

Searcher 306 passes each non-coherent sum to threshold detector 308. Threshold detector 308 receives a threshold from control processor 220. The threshold is selected according to methods well-known in the art. Discussions of the use of such thresholds in signal acquisition can be found, for example, in U.S. Pat. No. 5,644,591, issued Jul. 1, 1997, entitled "Method And Apparatus For Performing Search Acquisition In A CDMA Communication System," and U.S. Pat. No. 5,577,025, issued Nov. 19, 1996, entitled "Signal Acquisition In A Multi-User Communication System Using Multiple Walsh Channels, " which are incorporated herein by reference.

Threshold detector 308 compares each non-coherent sum to the threshold. When a non-coherent sum exceeds the threshold, the PN offset associated with the non-coherent sum is determined to be a correct hypothesis, and is sent or transferred to control processor 220. In one embodiment, threshold detector 308 generates an interrupt to inform control processor 220 that a non-coherent sum has exceeded the threshold. The PN offset can then be used to demodulate the data stream.

Alternatively, threshold detector 308 stores or accumulates a predetermined number of the largest non-coherent sums found during the search and maintains a dynamically sorted list of the sums (and associated offsets) that passed the threshold in the currently programmed search window. A typical value for this number is four, however other values can be used such as three, two, or one; and preferably this value is programmable, as desired.

Figure 4:
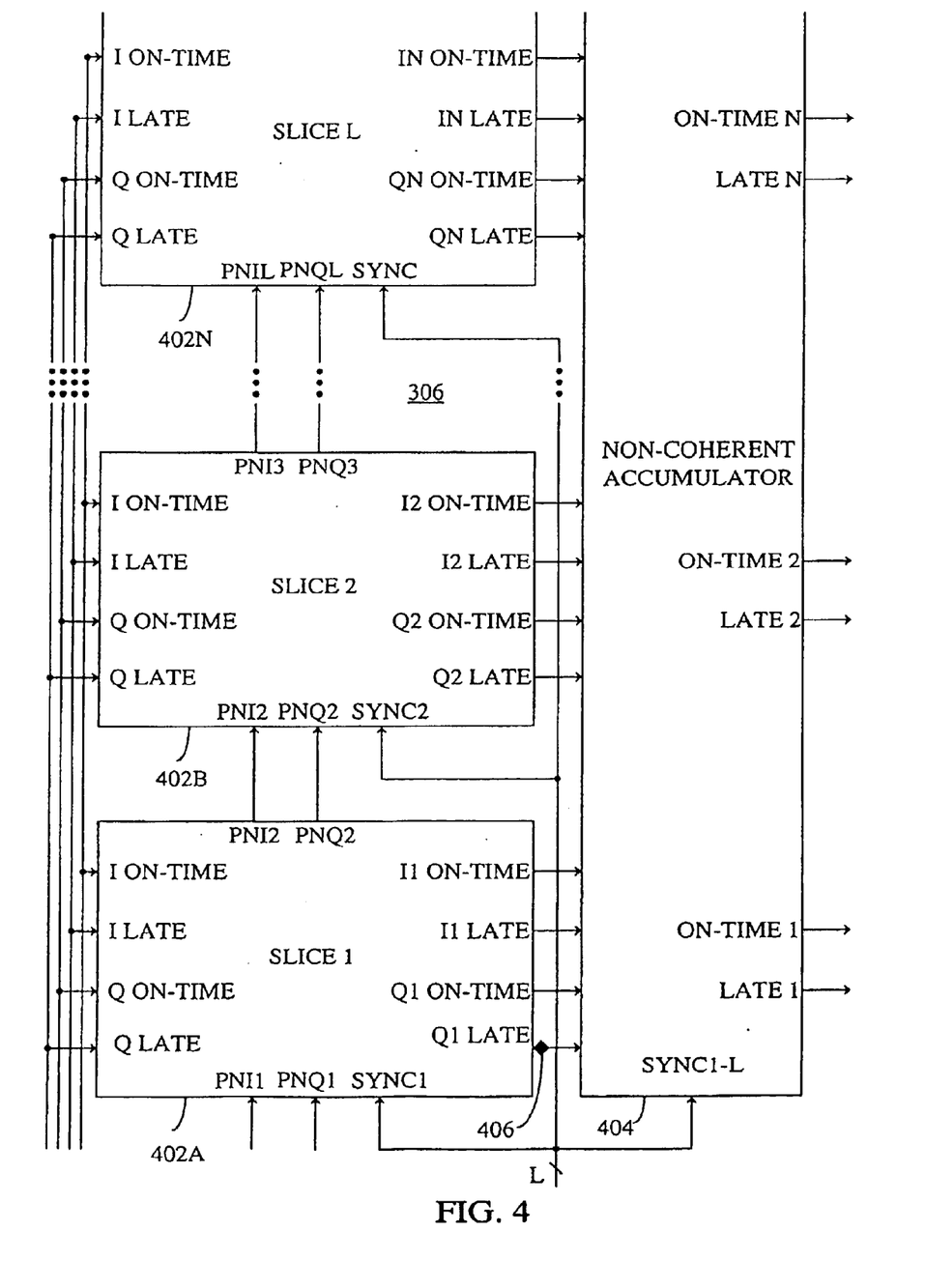
FIG. 4 is a block diagram depicting the architecture of a searcher processing element according to a preferred embodiment of the present invention.

FIG. 4 is a block diagram depicting the architecture of searcher 306 according to a preferred embodiment of the present invention. Searcher 306 includes a plurality of accumulating or processing elements, referred to herein as "slices," shown as elements 402A through 402L, which despread and process the received data stream or signal being acquired relative to particular PN and orthogonal codes. Each slice includes a despreader and a set of four coherent accumulators. A prescaler, shown as optional element 406, can also be used before each of the coherent accumulators, as desired.

Each slice 402 generates M coherent sums of N chips on the received data stream by accumulating chip energies over a pre-selected interval of time. An exemplary value of N here is 32 chips, although other values can be used, say as large as 288 or 1024 chips, a typical size for the outer and inner PN code sequences, respectively. A number of such accumulated values are squared, as discussed below and then further summed (both I and Q) to produce a non-coherent sum. In a preferred embodiment, the number of slices is sixteen (L=16). However, more or fewer slices can be used depending on the desired level of parallelism and the specific communication system, and known factors such as, desired searching speed, allowable circuit complexity, cost, and so forth.

Each slice 402 receives the four components of the data stream. The first slice, shown as slice 402A in FIG. 4, receives the PN sequences PNI1 and PNQ1 from multipliers 316A and 316B respectively. As will be described in detail below, each slice 402 includes a delay unit 506 (or 506'). The delay unit in each slice delays the PN sequences by a predetermined amount of time or delay before transferring the PN codes to the next slice 402 in searcher 306 for correlating with the data stream. The slices with their respective delay components form a tapped delay line where each element in the line holds the PN code for 1-chip time, 16 delays being implemented. The PN code is input to this line and is delayed by one chip for each subsequent slice in the line. It is possible to instead delay the data through the delay line, but the magnitude of data is larger and makes the process more complex (1-bit delay line versus 4-bit).

In this embodiment, no delay is imposed for processing within the current slice processing element, only the delay from the delay element of the previous slice is applicable. Alternatively, the delay unit can delay the PN codes before application in the current slice with which it is associated. This is illustrated by dashed lines in FIG. 5 for delay unit 506'. However, this latter approach typically operates at a slower processing rate, which is less desirable. In a preferred embodiment, each delay is one chip period of the PN sequence.

Because each slice 402 delays the PN sequences before passing them to the next slice 402, the result is that each slice 402 correlates the data stream using a different PN offset. Because this correlation occurs substantially simultaneously across a series of slices, searcher 306 can search multiple PN offset hypotheses in parallel. The result is that more hypotheses can be processed in a given period of time, yielding a shorter acquisition time or cycle.

Each slice 402 also receives a different synchronization signal from accumulator controller 314. In FIG. 4, these signals are labeled "SYNC1", "SYNC2", and so on, up to "SYNCL". These synchronization signals control the timing of the correlations of each slice 402. In a preferred embodiment, slices 402 operate in a "domino" fashion, with each slice initiating a correlation cycle one chip period after the initiation of the correlation cycle in the previous slice. For example, the correlation cycle in slice 402B begins one chip time later than the correlation cycle in slice 402A. Thus, each slice begins its correlation cycle at the same PN state in the PN sequences, but at a different point in the data stream.

This alignment of correlation cycles with PN state is especially advantageous in a system that employs multiple "nested" PN sequences. In one embodiment, the present invention employs two nested PN codes, referred to as "inner" and "outer" codes. The inner code corresponds to the PN code generated by PN code generator 312. The outer PN code remains constant over the entire period of the inner PN code. In that embodiment, the coherent accumulation cycle is aligned with the boundaries of the inner PN code sequence. Therefore, the accumulation is not affected by transitions of the state of the outer PN code. The use of nested PN codes is further described in a commonly-owned, copending U.S. patent application Ser. No. 09/169,358, entitled "Multi-Layered PN Code Spreading In A Multi-User Communications System," the disclosure of which is incorporated herein by reference.

Referring again to FIG. 4, searcher 306 also includes a non-coherent accumulator 404. The coherent sums of each slice 402 are transferred to non-coherent accumulator 404 for non-coherent accumulation. In a preferred embodiment, the coherent sums for each slice include an on-time coherent sum and a late coherent sum for each of the I and Q channels. For example, these sums are labeled "I1 ON-TIME", "I1 LATE", "Q1 ON-TIME", and "Q1 LATE" for slice 402A in FIG. 4.

Non-coherent accumulator 404 produces a pair of non-coherent sums for each slice, one for the "on-time" components, and one for the "late" components. Each non-coherent sum is obtained by summing the squares of the corresponding M I and Q coherent sums for a predetermined period of N chips or chip periods, providing N times M chips of data in the final non-coherent summation result. For example, the non-coherent sums for slice 402A are given by:

$$\text{ON-TIME } 1 = \sum_{J=1}^{M} (I1 \text{ ON-TIME})_J^2 + (Q1 \text{ ON-TIME})_J^2$$

$$\text{LATE } 1 = \sum_{J=1}^{M} (I1 \text{ LATE})_J^2 + (Q1 \text{ LATE})_J^2$$

The timing of each non-coherent accumulation cycle or period is controlled by signals from accumulator controller 314. In a preferred embodiment, the cycles proceed in "domino" fashion, with the cycle for each subsequent slice beginning one (1) chip period after the start of the cycle for the previous slice, there being L total slices used for processing signals during acquisition. Since there are N chips processed by the slices there are N chips of delay between the coherent sums outputs by a slice. The non-coherent accumulator results are fed to threshold detector 308, as described above.

Figure 5:
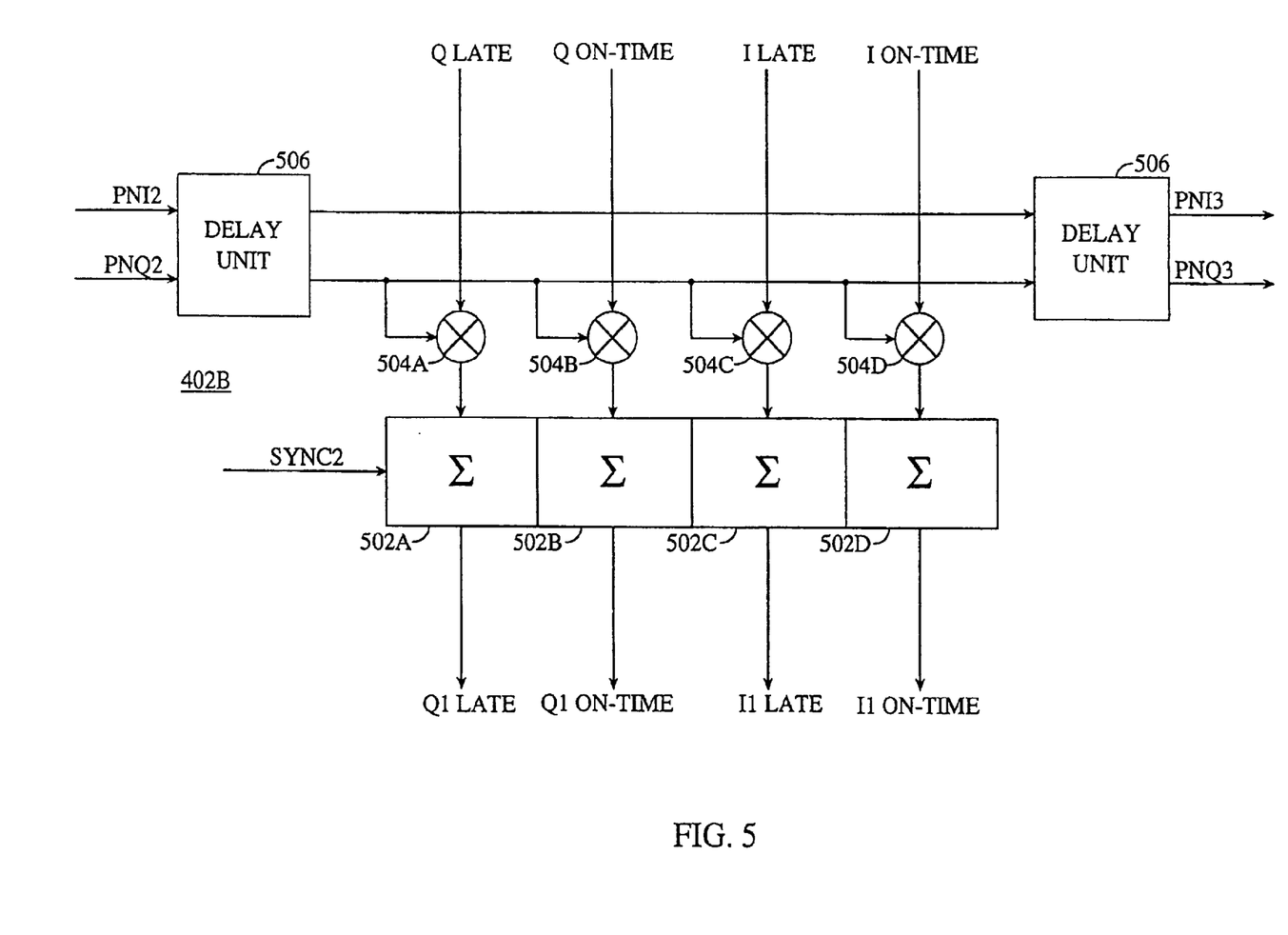
FIG. 5 is a block diagram depicting the architecture of a slice processing element according to a preferred embodiment of the present invention.

FIG. 5 is a block diagram depicting the architecture of slice 402B according to a preferred embodiment of the present invention. Slice 402B includes a plurality of accumulators 502A, 502B, 502C, and 502D; a plurality of multipliers 504A, 504B, 504C, and 504D; and a delay unit 506. Delay unit 506 receives the PN sequences fed to slice 402B. In the case of slice 402B, the PN sequences are PNI2 and PNQ2 provided by slice 402A. Delay unit 506 imposes a substantially uniform time delay on the PN sequences, as is well understood in the relevant art. In a preferred embodiment, the imposed delay is one chip period.

The signals, labeled "PNI2" and "PNQ2" in FIG. 5, are input or transferred to multipliers 504, while delayed signals labeled "PNI3" and "PNQ3," are input or transferred to the next slice 402C (not shown) in searcher 306. Alternatively, when configured with the delay element first as shown by the dashed outlined delay element 506', delayed signals "PNI3" and "PNQ3" are input both to multipliers 504 and to the next slice 402C. Multipliers 504 also receive the components of the data stream.

In the preferred embodiment, multipliers 504A and 504B receive the Q-channel PN sequence PNQ2. Multiplier 504A receives the late Q-channel data stream component Q LATE, and multiplier 504B receives the on-time Q-channel data stream component Q ON-TIME. Multipliers 504C and 504D receive the I-channel PN sequence PNI2. Multiplier 504C receives the late I-channel data stream component I LATE, and multiplier 504D receives the on-time I-channel data stream component I ON-TIME.

It should be understood that while multipliers are commonly used or conceptually employed to illustrate the despreading operation that occurs for spread spectrum signals. However, spreading is the equivalent to rotation by a multiple of 90 degrees. Therefore, despreading can be accomplished by applying the inverse rotation to the I and Q signals, based on the PN code of interest. The use of a rotation operation or element to implement despreading may be more appropriate in many situations to remove dependency on the unknown phase offset between the transmitter and receiver. Therefore, multipliers 504A, 504B, 504C, and 504D can be replaced by appropriate known rotators for this purpose.

Accumulators 502A, 502B, 502C, and 502D receive the outputs of multipliers 504A, 504B, 504C, and 504D respectively, and produce coherent sums Q1 LATE, Q1 ON-TIME, I1 LATE, and I1 ON-TIME, respectively. The timing of the accumulation cycles for accumulators 502 is typically controlled substantially in unison by a signal SYNC2 provided by accumulator controller 314. In a preferred embodiment, each accumulator accumulates over N chip periods, where N typically equals 32. However, other values can be chosen for N as discussed earlier, such as 1024 chips, the length of an inner PN code typically used.

Since the data sampling by the decimation and input elements or circuits are occurring at an eight time oversampling rate, as discussed earlier, (although others rates could be used in different applications) that means a clock of chip×8 is available for timing. At the same time, each sum or summation is updated at the chip×1 rate of the PN codes, and there is time between data points to process data at a chip×1 rate. Therefore, some degree of time sharing of hardware is possible and some of these operations can be serialized, not in unison, to save processing hardware, while achieving the one chip timing. The circuitry illustrated in the figures can be time shared to some extent to conserve costs and complexity for a searcher mechanism. For example, a single accumulator (multiplier or rotator) and temporary storage (memory) could be used to form the four sums in a slice like that used for the noncoherent accumulations, discussed below.

To take advantage of multiple Walsh code acquisition, as discussed in the earlier referenced patents, the coherent accumulations need to be synchronized with the PN codes. The first bit of the inner code, here 1024 chips, corresponds to the first bit of a Walsh symbol (code)(assumed length of 128). In this manner, eight Walsh symbols fit within each PN code period. Furthermore coherent accumulations are synchronized to symbol boundaries. If N, the length of the coherent accumulation, is 32, then an accumulation starts on the first, thirty-third, sixty-fifth, and ninety-seventh chips of each symbol. For N equal to 64, accumulations start on the first and sixty-fifth of each symbol, and for N equal to 128, a coherent accumulation covers exactly one symbol.

Figure 6:
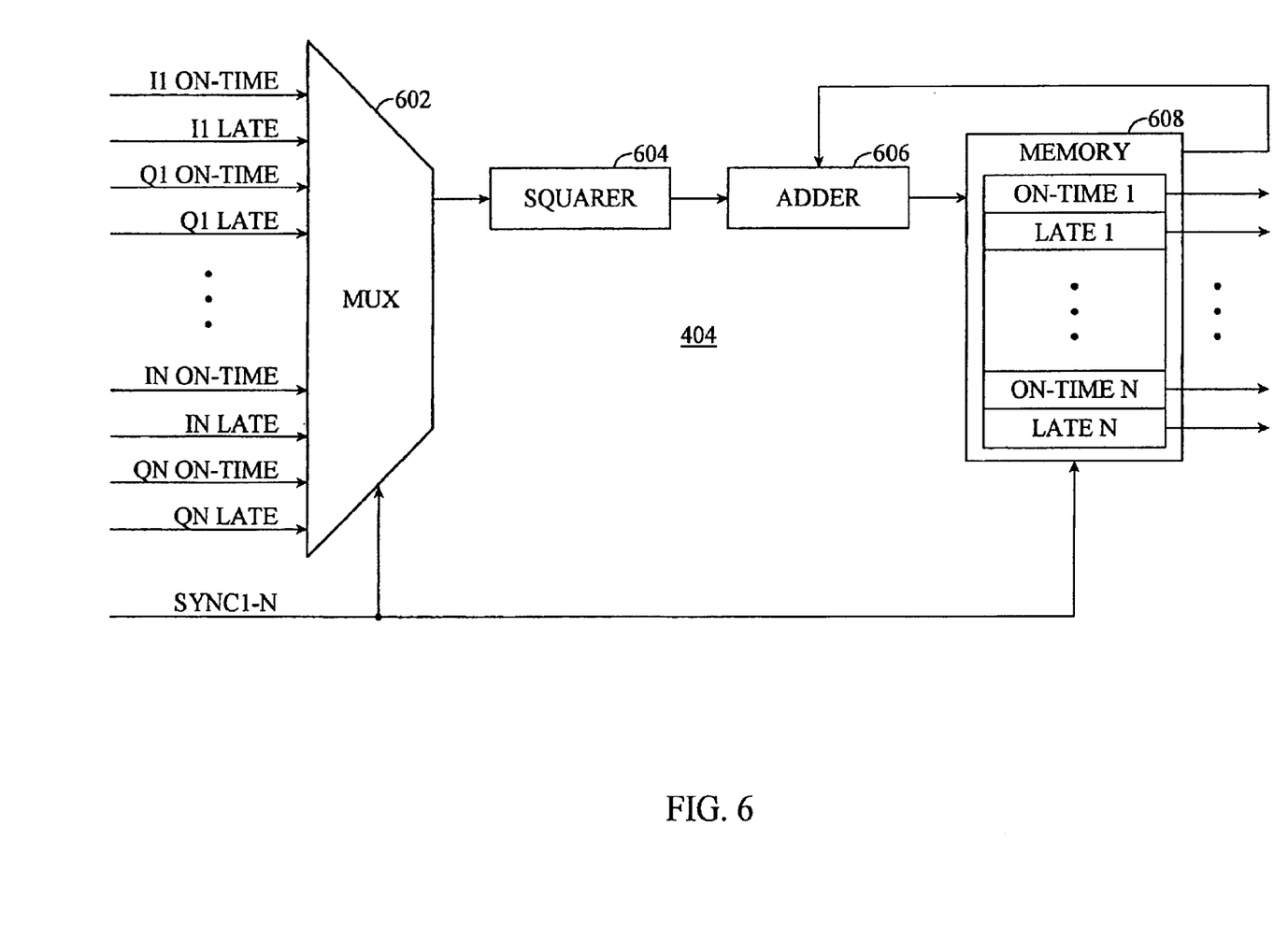
FIG. 6 is a block diagram depicting the architecture of a non-coherent accumulator according to a preferred embodiment of the present invention.

FIG. 6 is a block diagram depicting the architecture of non-coherent accumulator 404 according to a preferred embodiment of the present invention. When a set of 4 coherent accumulations are completed a square-and-accumulate engine forms $I^2+Q^2$ for the on-time and late samples. In this embodiment, all of the non-coherent accumulator sums are stored in a storage location or element such as memory 608, and are modified using a squarer 604 and an adder 606. A variety of known memory elements and adders can be used to implement the invention, as would be known, without affecting the teachings disclosed herein. A multiplexer 602 is used to select coherent sums for non-coherent accumulation based on the SYNC signals. The SYNC signals are also used to select the non-coherent sum in memory 608 to be modified. The coherent sums become available to multiplexer 602 sequentially. This arrangement allows all subsequent processing to be implemented with a single hardware data path which is time-shared between the different timing hypotheses being tested. This has the advantage that only one squarer and one adder are needed to perform all of the non-coherent accumulations. Multiple squarers and adders can also be used in a less- or non-time shared arrangement within the teachings of the invention if desired, as would be known.

The operation of non-coherent accumulator 404 is now described. At the beginning of a non-coherent accumulation cycle, the values in the locations within memory 608 are set to zero. After coherent sum I1 ON-TIME is received at multiplexer 602, it is selected by multiplexer 602 in accordance with the synchronization signals received from accumulator controller 314. The synchronization signals are also used to select a memory location in memory 608 that corresponds to non-coherent sum ON-TIME 1. Coherent sum I1 ON-TIME is squared by squarer 604. The squared coherent sum is added to the selected memory location. After the other coherent sum in the pair, Q1 ON-TIME is received at multiplexer 602, it is selected by multiplexer 602 in accordance with the synchronization signals received from accumulator controller 314. The synchronization signals are again used to select a memory location in memory 608 that corresponds to coherent sum ON-TIME 1. Coherent sum Q1 ON-TIME is squared by squarer 604. The squared coherent sum is added to the selected memory location. This operation is repeated M times for each of the on-time and late I-Q pairs in each slice 402. At the end of the non-coherent accumulation cycle, the non-coherent sums are sent from the locations of memory 608 to threshold detector 308, or the microprocessor as desired.

In a preferred embodiment, the present invention is used to search a search space having several dimensions. In a preferred embodiment, the dimensions include frequency offset, PN code, pilot Walsh channel, expected pilot signal strength, and PN offset. Frequency offset can result from Doppler effects introduced by the rapid motion of a signal source or relay element such as satellites with respect to the user terminal or gateway. Frequency error can also result from error introduced by a local oscillator used in the user terminal. For example, inexpensive oscillators may be less accurate, or oscillator output may drift with use or power levels. The search space includes a PN code dimension when the communications system uses multiple PN codes. In a preferred embodiment, communications system 100 includes eight I-Q pairs of PN codes. The search space also includes two different pilot channels using different Walsh codes.

In a preferred embodiment of the present invention, the values of N and M are programmable. These values are selected based on the expected strength of the pilot signal. By changing these values, the expected pilot signal strength dimension of the search space is traversed.

Figure 7:
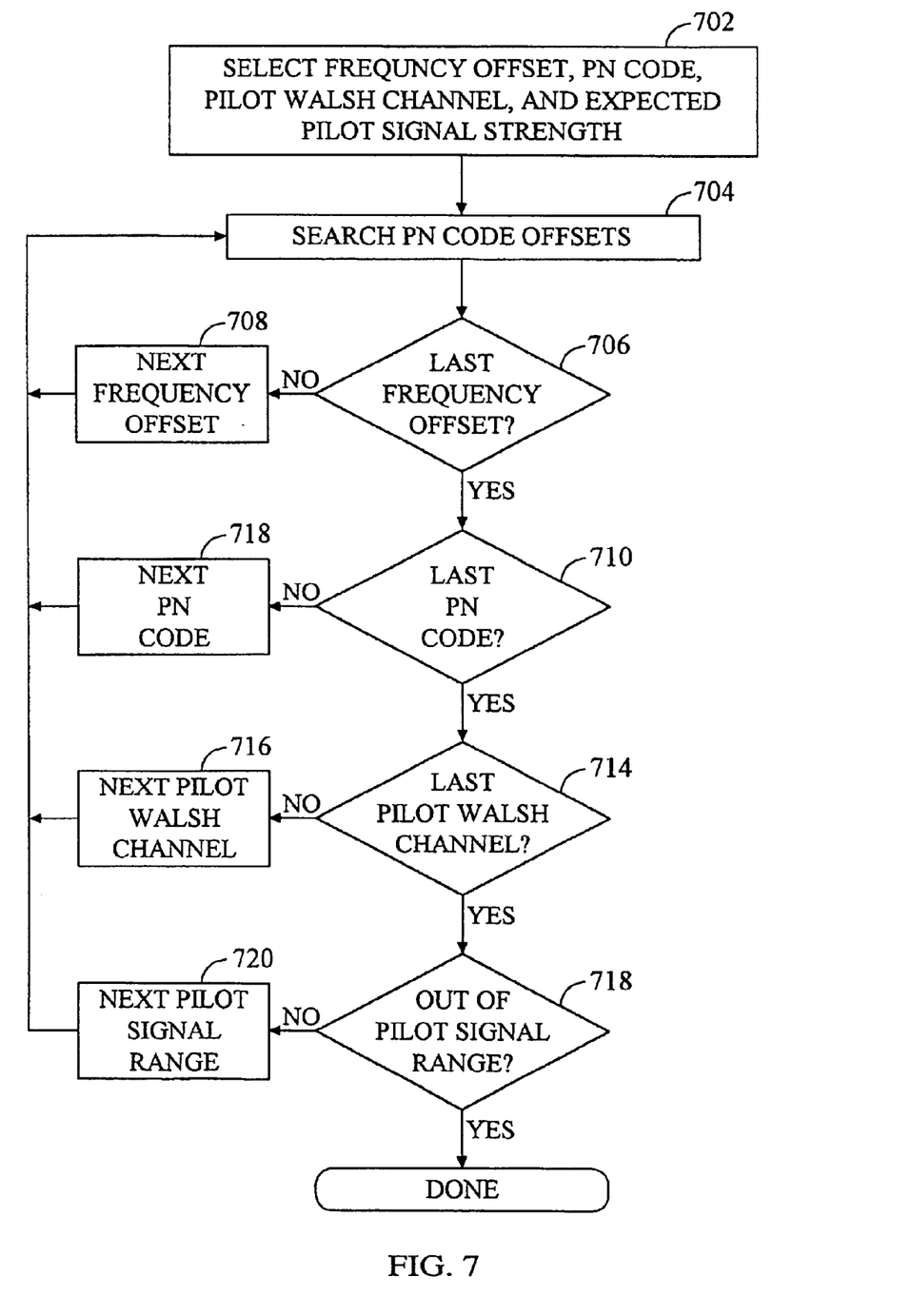
FIG. 7 is a flowchart depicting the search process of the present invention according to a preferred embodiment.

FIG. 7 is a flowchart depicting the search process of the present invention according to a preferred embodiment. The dimensions are searched in nested loops. Therefore, the loops are first initialized. In step 702, initial values are selected for frequency offset, PN code, pilot Walsh channel (orthogonal code used to generate pilot channel), and expected pilot signal strength. The PN offset dimension of the search space is then searched based on those values, as shown in step 704 and described in detail below with respect to FIG. 8. A different frequency offset is chosen, as shown in step 708, and the search of the PN offset dimension is repeated until all of the frequency offsets have been examined, as shown in step 706. The search of the PN offset and frequency offset dimensions is repeated for each PN code in the search space, as shown in steps 710 and 712. The search of the PN offset, frequency offset, and PN code dimensions is repeated for each pilot Walsh channel in the search space, as shown in steps 714 and 716.

If it is expected that the available pilot signals vary greatly in strength, then the search of the PN offset, frequency offset, PN code, and pilot Walsh channel dimensions can also, optionally, be repeated for each expected pilot signal strength range in the search space, as shown in steps 718 and 720, if multiple strength ranges are employed. Generally, the pilot signals predictably fall within a certain strength range and searches over multiple ranges is not desired. When the search over the expected parameters or ranges is finished, the search space has been completely searched.

At this point, the process returns to the beginning and commences searching for new pilot signals or PN offsets to acquire, and so forth. Alternatively, where multiple services are potentially available for the user terminal, such as terrestrial cellular service versus satellite communication service, for example, the search space can be expanded to include another dimension of "system determination." This parameter can have a value set to one state (service) to initially, or randomly, select a desired service or be based on a predicted availability of service. At the completion of one processing cycle, as described above, this parameter can be reset and the above process repeated, before returning to the initial system search state.

Figure 8:
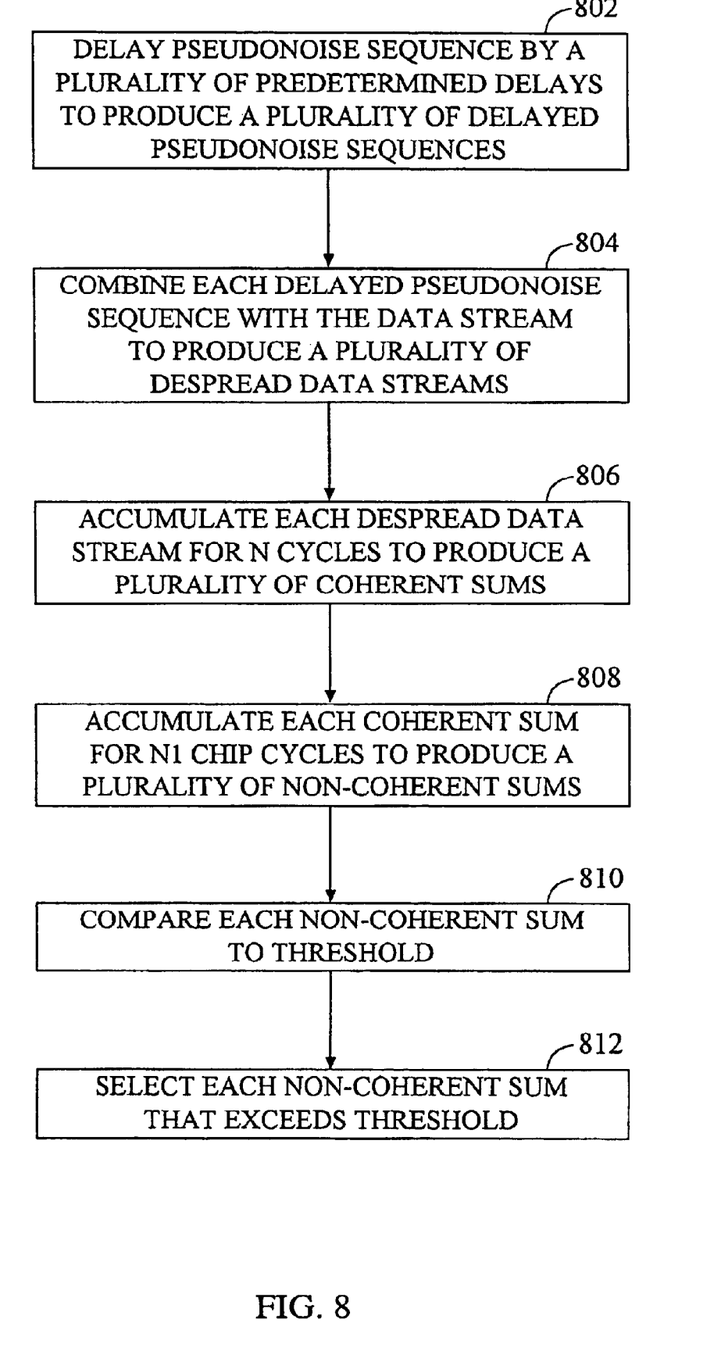
FIG. 8 is a flowchart describing the operation of the present invention in searching the PN offset dimension of a search space for a data stream according to a preferred embodiment.

FIG. 8 is a flowchart describing the operation of the present invention in searching the PN offset dimension of a search space for a data stream according to a preferred embodiment. This process corresponds to step 704 of FIG. 7. In step 802, the pseudonoise sequence produced by PN code generator 312 is delayed by a preselected amount by delay units 506 to produce a plurality of delayed pseudonoise sequences. Each delayed pseudonoise sequence is combined with the data stream to produce a plurality of despread data streams, as shown in step 804. This combining is performed by multipliers 504 (or rotators when used), as described above. Each despread data stream is accumulated for a period of N chips to produce a coherent sum, as shown in step 806. This coherent accumulation is performed by summers 502. Corresponding pairs of coherent sums are accumulated for M coherent accumulator cycles to produce a plurality of non-coherent sums, as shown in step 808. The non-coherent accumulation is performed by non-coherent accumulator 404.

Each non-coherent sum is compared to a threshold by threshold detector 308, as shown in step 810. Those sums that exceed the threshold are selected for use in determining the timing used for demodulation, as shown in step 812. In one embodiment, threshold detector 308 remembers, stores or accumulates a predetermined number of the largest non-coherent sums found during the current search, while disallowing or ignoring entries that are only one-half chip offset from another non-coherent sum. A local maxima circuit or element is generally used to allow rejection of the adjacent hypotheses (1/2 chip) from both entering the table. In this situation, only the larger of the two is allowed even though both may be larger than other entries. This capability greatly reduces the peak-detection processing required of the present invention.

When a non-coherent sum is selected for use in demodulation, the PN offset associated with that non-coherent sum is provided to a selected digital data receiver 216. The selected digital data receiver uses the provided PN offset and the PN code to demodulate the data stream.

The processing thus far described covers one set of L PN offsets in slices 402A–402L. In order to search the entire possible code offset space, means shifting through all N chips in the code. That is, the application of several slices to process the offsets in parallel only addresses L offsets, resulting in another N-L offsets or code hypothesis untested. For a given PN code of say 1024 chips (N=1024, but other lengths can be used) the PN offset search of L offset chips describes a search of L out of 1024 possible offset values. This type of search or search space is referred to as one rake of a search. After each rake is completed, the offsets need to be adjusted or slewed to the next set of L PN offset hypothesis, and the search recommenced. Therefore, to search a total of N PN offsets requires N/L rakes. For L=16 and N=1024 this would be 64 rakes through the searcher.

A technique found advantageous in the represent invention is to "slew" the searcher PN timing to the next set of L PN offset hypotheses by adjusting the timing of the PN code or code generator, so that the code is effectively shifted by a factor of L before each rake is started over for the L slices. This is seen in the timing diagram of FIG. 9 which illustrates the relationship between the PN clock rate of chip×1 and the various signals used in slices 402, and in the processing of the data.

Figure 9A:
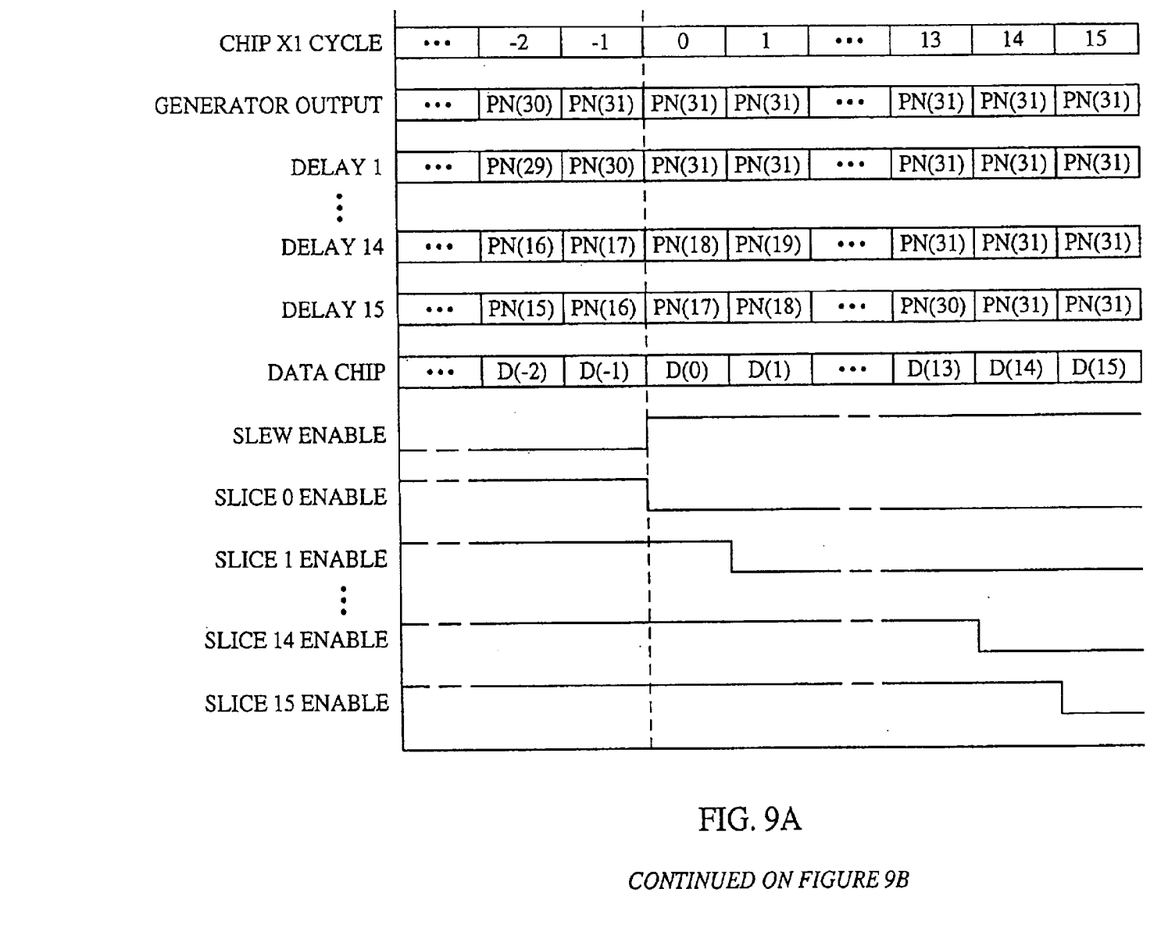
FIG. 9 illustrates the relative timing of signals and signal processing steps including the application of slewing to allow processing of multiple sets of code offsets.
Figure 9B:
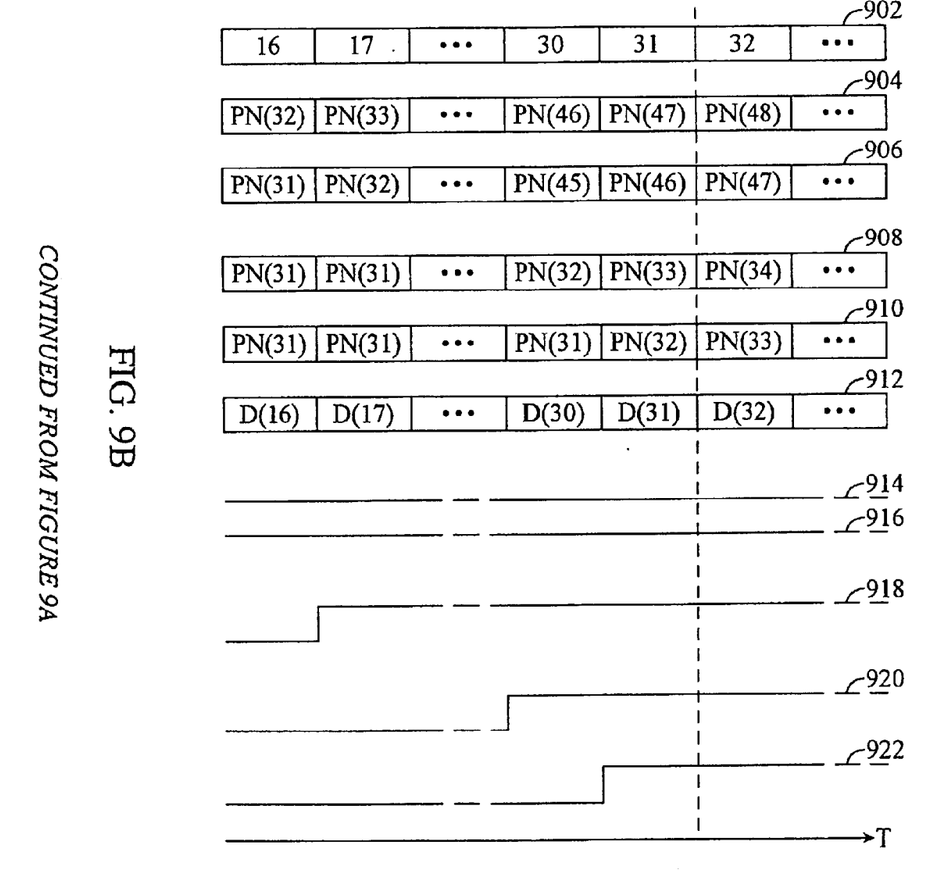

In FIG. 9, the basic PN code timing clock cycle 902 (chip×1) is shown at the top with time commencing on the left side and increasing toward the right side. This is followed down the figure by Delay 1, Delay 14, and Delay 15 outputs 906, 908, and 910 respectively, with Data Chip input 912 for the data stream. The next set of illustrated signals are a Slew Enable signal 914, and slice enable signals Slice 0 Enable, Slice 1 Enable, Slice 14 Enable, and Slice 15 Enable, labled as 916, 918, 920, and 922, respectively.

The illustrated relative timing of code generator output 904 commences with chip number PN(30), while Delays 1, 14, and 15 start with PN(29), PN(16), and PN(15), respectively, clearly showing the PN offsets or offset in code timing affected by the delay elements in the slices. The processing of each slice is controlled using the Slice Enable signals or commands, with each one occurring one chip after the previous one. After the slices have finished processing using the first L (16) PN offsets, or the PN codes have been shifted through by the desired delay amounts, the PN code generator is frozen, locked, retarded, suspended, or delayed (slewed) from generating or outputting further code chips.

PN(31) is the last chip to be used in the last coherent accumulations (N=32) at the initial PN offset hypotheses. This is seen as Slew Enable signal 914 changing state (for example here going high) and in code output 904 reaching chip value PN(31) and holding, replicating, or continuing to output the same chip PN(31) for a preselected period until it is desired to start processing in the slices again. This occurs when the next offset set is reached, that is the PN timing is shifted by L. This is shown as Slew Enable signal 914 changing state (for example here going low) and in code output 904 reaching chip values PN(32) . . . PN(45), PN(46), and so forth. PN(32) is the first chip to be used in the first coherent accumulations (N=32) at the next set of hypotheses. This continues until the next slew point is reached, and the process repeats by a new slew enable signal occurring or being issued by the processor, and processing begins again after shifting another L offsets. It can be seen that typically Data chip D(15) is not used in the accumulations, and Slew Enable (freeze PN generator) is the complement of Slice 0 Enable.

IV Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as our invention is:

1. A parallel searcher for use in a wireless communications device, comprising:
   a pseudonoise code generator for generating at least one pseudonoise sequence having a predetermined chip period;
   a plurality of slices in said searcher for processing PN spread signals, each slice including:
      a delay unit for delaying said pseudonoise sequence by a predetermined chip period,
      a despreader comprising a complex rotator for operating on a data stream as a function of a pseudonoise sequence, which is a delayed pseudonoise sequence from a previous slice when the slice is not a first slice of said plurality, and
      at least one coherent accumulator for coherently accumulating an output of said despreader; and
   a non-coherent accumulator that accumulates the output of each slice non-coherently to produce a non-coherent sum for each slice;
   wherein an output from said pseudonoise generator is coupled to an input of the delay unit of a next slice, except when the current slice is the last slice of said plurality; and
   wherein each slice has an output from the delay unit coupled to an input of the delay unit of a next slice.

2. The parallel searcher of claim 1, further comprising an accumulator controller for sequentially initializing said coherent accumulators and sequentially coupling the outputs of said coherent accumulators to said non-coherent accumulator based on the state of said pseudonoise sequence.

3. The parallel searcher of claim 1, wherein each said coherent accumulator comprises:
   a multiplier that receives said pseudonoise sequence and said data stream; and
   an accumulator that receives the output of said multiplier.

4. A parallel searcher for use in a wireless communications device, comprising:
   a pseudonoise code generator for generating at least one pseudonoise sequence having a predetermined chip period;
   a plurality of slices in said searcher for processing PN spread signals, each slice including:
      a delay unit for delaying said pseudonoise sequence by a predetermined chip period, having an output from said pseudonoise generator coupled to an input of the delay unit of a next slice, except when the current slice is the last slice of said plurality, and each slice having an output from the delay unit coupled to an input of the delay unit of a next slice,
      a despreader for operating on a data stream as a function of a pseudonoise sequence, which is a delayed pseudonoise sequence from a previous slice when the slice is not a first slice of said plurality,
      at least one coherent accumulator for coherently accumulating an output of said despreader said non-coherent accumulator comprising:
         a multiplexer that receives as inputs the outputs of each slice;
         a squarer that squares the output of said multiplexer;
         a memory that stores a sum for each slice;
         a selector that selects one of said multiplexer inputs and a corresponding one of said sums based on the state of said pseudonoise sequence; and
         an adder that adds to said selected sum the output of said squarer; and
   a non-coherent accumulator that accumulates the output of each slice non-coherently to produce a non-coherent sum for each slice.

5. The parallel searcher of claim 1, further comprising:
   a control processor that generates a threshold; and
   a threshold detector that receives said non-coherent sum from said non-coherent accumulator and selectively provides the delay associated with said non-coherent sum to said control processor based on said threshold.

6. The parallel searcher of claim 5, further comprising means for storing a dynamically sorted list of a predetermined number of non-coherent sums that exceeds a threshold during a search window.

7. The parallel searcher of claim 1, further comprising:
   a Walsh code generator that generates a Walsh code; and
   a multiplier that combines said Walsh code with said pseudonoise sequence prior to said slices.

8. A parallel searcher for use in a wireless communications device, comprising:
   a pseudonoise code generator for generating at least one pseudonoise sequence having a predetermined chip period;
   a plurality of slices in said searcher for processing PN spread signals, each slice including:
      a delay unit for delaying said pseudonoise sequence by a predetermined chip period, having an output from said pseudonoise generator coupled to an input of the delay unit of a next slice, except when the current slice is the last slice of said plurality, and each slice having an output from the delay unit coupled to an input of the delay unit of a next slice, a despreader for operating on a data stream as a function of a pseudonoise sequence, which is a delayed pseudonoise sequence from a previous slice when the slice is not a first slice of said plurality, and at least one coherent accumulator for coherently accumulating an output of said despreader;

a non-coherent accumulator that accumulates the output of each slice non-coherently to produce a non-coherent sum for each slice;

a Walsh code generator that generates a Walsh code, wherein said Walsh code generator is programmable for alternative Walsh code sequences in response to a selection input allowing searches over different orthogonal codes; and a multiplier that combines said Walsh code with said pseudonoise sequence prior to said slices.

9. The parallel searcher of claim 1 wherein said pseudonoise code generator is programmable for alternative PN codes in response to a selection input allowing searches over different PN codes.

10. A parallel searcher for use in a wireless communications device, comprising:

a pseudonoise code generator for generating at least one pseudonoise sequence having a predetermined chip period;

a plurality of slices in said searcher for processing PN spread signals, each slice including:

a delay unit for delaying said pseudonoise sequence by a predetermined chip period, having an output from said pseudonoise generator coupled to an input of the delay unit of a next slice, except when the current slice is the last slice of said plurality, and each slice having an output from the delay unit coupled to an input of the delay unit of a next slice, a despreader for operating on a data stream as a function of a pseudonoise sequence, which is a delayed pseudonoise sequence from a previous slice when the slice is not a first slice of said plurality, and at least one coherent accumulator for coherently accumulating an output of said despreader;

a non-coherent accumulator that accumulates the output of each slice non-coherently to produce a non-coherent sum for each slice; and a rotator in series with an input for said slices for receiving input data and applying a preselected amount of rotation thereto, being controllable to enable searching over different Doppler frequency offset ranges.

11. A wireless communication device comprising:

a parallel searcher, comprising:

a pseudonoise code generator for generating a pseudonoise sequence;

a plurality of slice processing elements in said searcher for processing PN spread signals, each slice including:

a delay unit for delaying said pseudonoise sequence by a predetermined chip time, a despreader comprising a complex rotator for operating on a data stream as a function of said delayed pseudonoise sequence, except for when it is a first despreader, and at least one coherent accumulator for coherently accumulating an output of said despreader; and a non-coherent accumulator that accumulates the output of each slice non-coherently to produce a non-coherent sum for each slice;

wherein an output from said pseudonoise generator is coupled to an input of the delay unit of a next slice, except when the current slice is the last slice of said plurality;

wherein each slice has an output from the delay unit coupled to an input of the delay unit of a next slice.

12. A method for detecting the presence of a signal in a data stream, said signal being spread using a pseudonoise sequence, comprising the steps of:

delaying a pseudonoise sequence by a plurality of predetermined delays to produce a plurality of delayed pseudonoise sequences;

combining each of said delayed pseudonoise sequences with the data stream to produce a plurality of despread data streams;

accumulating each of said despread data streams for a duration to produce a plurality of coherent sums;

accumulating each of said coherent sums for a further duration to produce a plurality of non-coherent sums;

comparing each of said non-coherent sums to a threshold;

selecting a non-coherent sum that exceeds said threshold and controlling timing with sufficient precision to allow un-degraded operation in the presence of multi-layered PN codes.

13. The method of claim 12, further comprising the step of despreading said data stream using a delayed version of said pseudonoise sequence, said delayed version produced by delaying said pseudonoise sequence using the one of said plurality of predetermined delays that corresponds to said selected non-coherent sum.

* * * * *